(12) United States Patent
Van Lier et al.

(10) Patent No.: US 8,397,673 B2
(45) Date of Patent: Mar. 19, 2013

(54) METHOD OF AND SYSTEM FOR SUPPLYING FEED

(75) Inventors: Wilhelmus Johannes Adrianus Van Lier, Roosendaal (NL); Arie Van Der Wouden, Lekkerkerk (NL); Leendert Kool, Stolwijk (NL); Meindert Graveland, Bergschenhoek (NL)

(73) Assignee: Lely Patent N.V., Maassluis (NL)

( * ) Notice: Subject to any disclaimer, the term of this patent is extended or adjusted under 35 U.S.C. 154(b) by 181 days.

(21) Appl. No.: 13/070,505

(22) Filed: Mar. 24, 2011

(65) Prior Publication Data

US 2011/0168099 A1 Jul. 14, 2011

Related U.S. Application Data

(63) Continuation of application No. PCT/NL2009/000167, filed on Sep. 1, 2009.

(30) Foreign Application Priority Data

Sep. 24, 2008 (NL) .................................... 1035974

(51) Int. Cl.
*A01K 5/02* (2006.01)

(52) U.S. Cl. ................... 119/51.02; 119/14.18

(58) Field of Classification Search .... 119/14.01–14.55, 119/51.02
See application file for complete search history.

(56) References Cited

U.S. PATENT DOCUMENTS

| | | | | |
|---|---|---|---|---|
| 4,508,058 A | * | 4/1985 | Jakobson et al. | 119/14.02 |
| 5,769,023 A | * | 6/1998 | van der Lely et al. | 119/14.02 |
| 5,778,820 A | * | 7/1998 | van der Lely et al. | 119/14.18 |
| 5,816,191 A | * | 10/1998 | Beaudoin et al. | 119/57.92 |
| 7,530,327 B2 | * | 5/2009 | Voogd et al. | 119/51.02 |
| 2006/0191485 A1 | * | 8/2006 | Francke et al. | 119/14.03 |

FOREIGN PATENT DOCUMENTS

| | | |
|---|---|---|
| CA | 2150068 A1 | 11/1996 |
| GB | 2190767 A | 11/1987 |
| WO | 9110358 A1 | 7/1991 |
| WO | 0013499 A1 | 3/2000 |

OTHER PUBLICATIONS

International Search Report and written opinion for PCT/NL2009/000167 (issued Dec. 3, 2009).
NL Search Report for NL 1035974 (issued Apr. 22, 2009).

\* cited by examiner

*Primary Examiner* — Kimberly Berona
*Assistant Examiner* — Danielle Clerkley
(74) *Attorney, Agent, or Firm* — Coraline J. Haitjema; David P. Owen; Hoyng Monegier LLP

(57) ABSTRACT

Method of supplying feed to animals with the aid of a group of feed stations which are accessible to those animals, wherein the feed stations, following the identification of an animal, supply feed to that animal according to a feed program for that animal adjusted to that individual animal and taking into account data relating to earlier feed supplies to that animal, wherein data relating to a feed supply to an animal are made available to each feed station via data connections, and wherein, in the event of failure of the data connection for at least one of the feed stations, at least one of the feed stations is operated to switch over to a safety feed program to reduce the feed supply to an animal identified at that feed station.

38 Claims, 3 Drawing Sheets

METHOD OF AND SYSTEM FOR SUPPLYING FEED

CROSS REFERENCE TO RELATED APPLICATIONS

This application is a continuation of PCT application number PCT/NL2009/000167 filed on 1 Sep. 2009, which claims priority from Netherlands application number NL 1035974 filed on 24 Sep. 2008. Both applications are hereby incorporated by reference in their entireties.

BACKGROUND OF THE INVENTION

1. Field of the Invention

The invention relates to a method and a system for supplying feed to animals, in particular hoofed animals, in particular dairy cattle, with the aid of a group of feed stations which are accessible to these animals.

2. Description of the Related Art

Animals can be kept in groups in a separate area, such as a pasture. A (concentrate) feeding facility (feed station) can be provided in this area, possibly in combination with a facility for milking the animals (milking station). Systems are known in which a plurality of feed stations or milking stations are located in such an area. These operate automatically, using a central animal management system. A feed station, which may or may not form part of a milking station, is provided with its own supply container for feed, with feed supply means and with its own local control unit (computer) to operate the feed supply means. Feed supply adjusted to the individual cow is possible here through animal identification and through the use of a feed program which is adjusted to the individual animal and which is calculated in a central computer onto which the animal management system is loaded. The feed program is recalculated for each new cycle, for example, every twenty-four hours, for each animal, using data relating, inter alia, to the time elapsed since the last lactation, and the milk yield. The cycle is divided up into periods, for example of 20 minutes. Following this recalculation, this feed program is transferred to each local control unit, and comprises a datum relating to the quantity of feed which must be supplied per cycle to an animal and a resulting feed dose per period, the period dose. In the transition from one cycle to the following cycle, no balance is usually carried over.

In each local control unit, a feed balance is recorded for each animal, with an additional recording of the period dose for each period. When an animal has received a feed dose in a feed station, this dose is subtracted by the local control unit from the balance for that animal. Via the control centre, the same feed receipt is subtracted by the local control units of all other feed stations from the feed balance for that animal.

The data relating to the feed doses supplied by the feed stations can also be stored in the central animal management system.

It may happen that one or more of the local control units no longer receive the data relating to the supply of a feed dose to an animal at the location of a feed station as a result of a fault. This fault may, for example, be a break in a data cable between a local computer and the central computer, damage to a transmitter or receiver for wireless data transmission or failure of the central computer (for example due to a power failure). The feed balance for that animal is then not reduced the local control unit of that feed station. As a result, the local control unit operates the feed supply means on the basis of old data, whereby an animal may be given more feed than that animal is entitled to according to its feed program. This situation may be repeated. This is undesirable, particularly in the case of concentrated feed.

BRIEF SUMMARY OF THE INVENTION

One object of the invention is to provide a method and/or a system of the aforementioned type which can make an improvement herein.

From one aspect, the invention provides for a method of supplying feed to animals with the aid of a group of feed stations which are accessible to those animals, wherein the feed stations, following the identification of an animal, supply feed to that animal according to a feed program for that animal adjusted to that individual animal and taking into account data relating to earlier feed supplies to that animal, wherein data relating to a feed supply to an animal are made available to each feed station via data connections, wherein, in the event of failure of the data connection for at least one of the feed stations, at least one of the feed stations is operated to switch over to a safety feed program to reduce the feed supply to an animal identified at that feed station.

Thus, it is possible in at least one feed station, by means of the safe mode, to deviate from the feed program, in the sense that, in the system of the group of feed stations, less feed is made available on balance to the animals. The risk of overfeeding is thereby reduced.

In a first embodiment, the feed program is applied, in the absence of the aforementioned failure, for one cycle, which cycle is divided up into a number of periods, wherein, for each period and for each animal, a period feed dose calculated for that animal is added to a feed balance for that animal, wherein feed supplies to that animal are subtracted from the feed balance.

In a first further development thereof, the safety feed program comprises the slowing down of the increase of the feed balance in comparison with the increase thereof according to the feed program. By slowing down the feed balance build-up, less feed will be made available on balance to the animals. In one embodiment thereof, the slowing down of the increase of the feed balance is implemented by extending the period duration. This can be done, for example, by multiplying the period duration according to the feed program by a number equal to the number of feed stations in the group. In another embodiment, the slowing down of the increase of the feed balance is implemented by reducing the period dose. This can be done, for example, by dividing the period dose according to the feed program by a number equal to the number of feed stations in the group.

In a second further development thereof, the safety feed program entails the maximization of the feed balance. Thus, an upper limit is set for the balance, above which further build-up is not possible. This can be done, for example, if no maximum is set in normal operation. If a maximum feed balance is maintained in the feed program, the maximum feed balance according to the safety feed program will be lower than the maximum feed balance according to the feed program. This can be done, for example, by setting the maximum feed balance according to the safety feed program to the maximum feed balance according to the feed program, divided by a number equal to the number of feed stations in the group.

In a second embodiment, the feed program supplies a program dose adjusted to the individual animal and the safety feed program entails the replacement of the program dose with a safety feed dose which is less than the program feed dose for the animal concerned. Analogous to the description above, the safety dose may be equal to or less than the program feed dose for that animal, divided by the number of feed stations in the group.

In the event of failure of the data connection, one or more different processes are possible on the basis of further aspects of the invention.

Thus, in one embodiment, in the event of failure of the data connection for at least one of the feed stations, that feed station can be operated to switch over to the safety feed program. This may involve failure of the data connection to at least one of the feed stations, and/or failure of the data connection from at least one of the feed stations.

Alternatively or additionally, in the event of failure of the data connection for at least one of the feed stations, one or more of the other feed stations can be operated to switch over to the safety feed program. This may involve failure of the data connection from at least one of the feed stations. The risk of overfeeding is thereby reduced. In the event that all other feed stations are thus operated, no animal at any of the other feed stations can then be given too large a feed portion at one time.

In one embodiment, in the event of failure of the data connection for at least one of the feed stations, each feed station is operated to switch over to the safety feed program, whereby the reduction of the aforementioned risk can be optimized.

In an autonomous embodiment of the feed stations, the safety feed program is run by the dedicated control unit of the relevant visited feed station which is connected in normal use to the data connection, after the local control unit has detected the failure of the data connection.

If the data connection is connected to a central data storage and processing facility which forms part of a central control unit, and if the failure of the data connection results from a fault in the central control unit, all feed stations can, in one embodiment, be operated to switch over to the safety feed program.

If the data connection is connected to a central data storage and processing facility which forms part of a central control unit, and the central control unit remains operational, the latter can detect the failure of the data connection from a local control unit and can control the other feed stations on the basis thereof to switch over to the safety feed program.

In one simple embodiment, failure of the data connection is detected if no data relating to earlier feed supplies are made available via this data connection within a defined period. For this purpose, for example, one or more timers can be used in one or more of the control units which are operatively connected to the data connection.

In one embodiment, failure of the data connection is detected if, in the event that one feed station in which an animal is identified requests data relating to feed supplies which have been made to that animal by one or more other feed stations, these data are not made available.

It should be noted that a feed supply can be equated with a quantity of feed made available to an animal during one visit to a feed station by that animal, or as equivalent to a quantity of feed consumed by an animal during one visit to a feed station by that animal.

In one embodiment with milking stations, the supply of feed is combined with the milking of the animal in a milking station provided in a feed station visited by the animal.

From a further aspect, the invention provides a system which is configured to carry out a method according to the invention, in particular as described above. Here, the feed stations can be provided with a local control unit, with which they can operate autonomously in the event of failure of the data connection for a feed station concerned. Moreover, one or more of the local control units can then be configured to switch over to the aforementioned safety feed program.

From a further aspect, the invention provides for a system for supplying feed to animals, comprising
  a group of feed stations available to these animals, wherein each feed station is provided with
    a feed supply device,
    means for identifying an individual animal,
    an accessible local memory for storing a feed program adjusted to the individual animal, and
    a local control unit to determine, on the basis of the identification and the associated stored feed program, a feed dose to be supplied and to operate the feed supply device on the basis thereof,
  furthermore comprising
    first data transmitters for the provision of animal-related data relating to a feed supply by the feed supply device of a feed station used by an animal from the local control unit concerned to the local control units of the other feed stations, and
    second data transmitters for the reception, by the local control unit of a feed station to be used by an identified animal, of the animal-related data relating to an earlier feed supply by the feed supply device of a feed station used by that animal, wherein the system is provided with at least one detector, for example a timer or a comparator, to detect a fault in the transmission of data by at least one of the first and/or second data transmitters, and the system is configured to operate, on the basis of the fault detected by the detector, at least one of the feed stations to switch over to a safety feed program to reduce the feed supply to an animal identified at that feed station. With such a system, overfeeding of the animals can be prevented in the event of the aforementioned fault.

In one embodiment, the detector is configured to detect a fault in the transmission of data by a second transmitter. In this case, such a detector can be provided in the local control units of each of the feed stations, and can be configured to switch over to the safety feed program on the basis of a fault detected by this detector.

In one embodiment, the system according to the invention is provided with a central control unit which supplies the first and second data connections. In a further development thereof, the central control unit can be provided with a detector to detect a fault in the transmission of data by the first data transmitters from one of the local control units, and can be configured to send a signal to the other local control units on the basis thereof to switch over to the safety feed program.

In one embodiment, the safety feed program is settable depending on the number of feed stations in the group.

As stated, at least a number of feed stations can be provided in a respective dedicated milking station.

In one embodiment, the group of feed stations is surrounded by an animal partition.

BRIEF DESCRIPTION OF THE DRAWINGS

The invention will be explained with reference to illustrative embodiments of a system according to the invention shown schematically in the attached figures, in which.

DESCRIPTION OF ILLUSTRATIVE EMBODIMENTS

Figure 1:
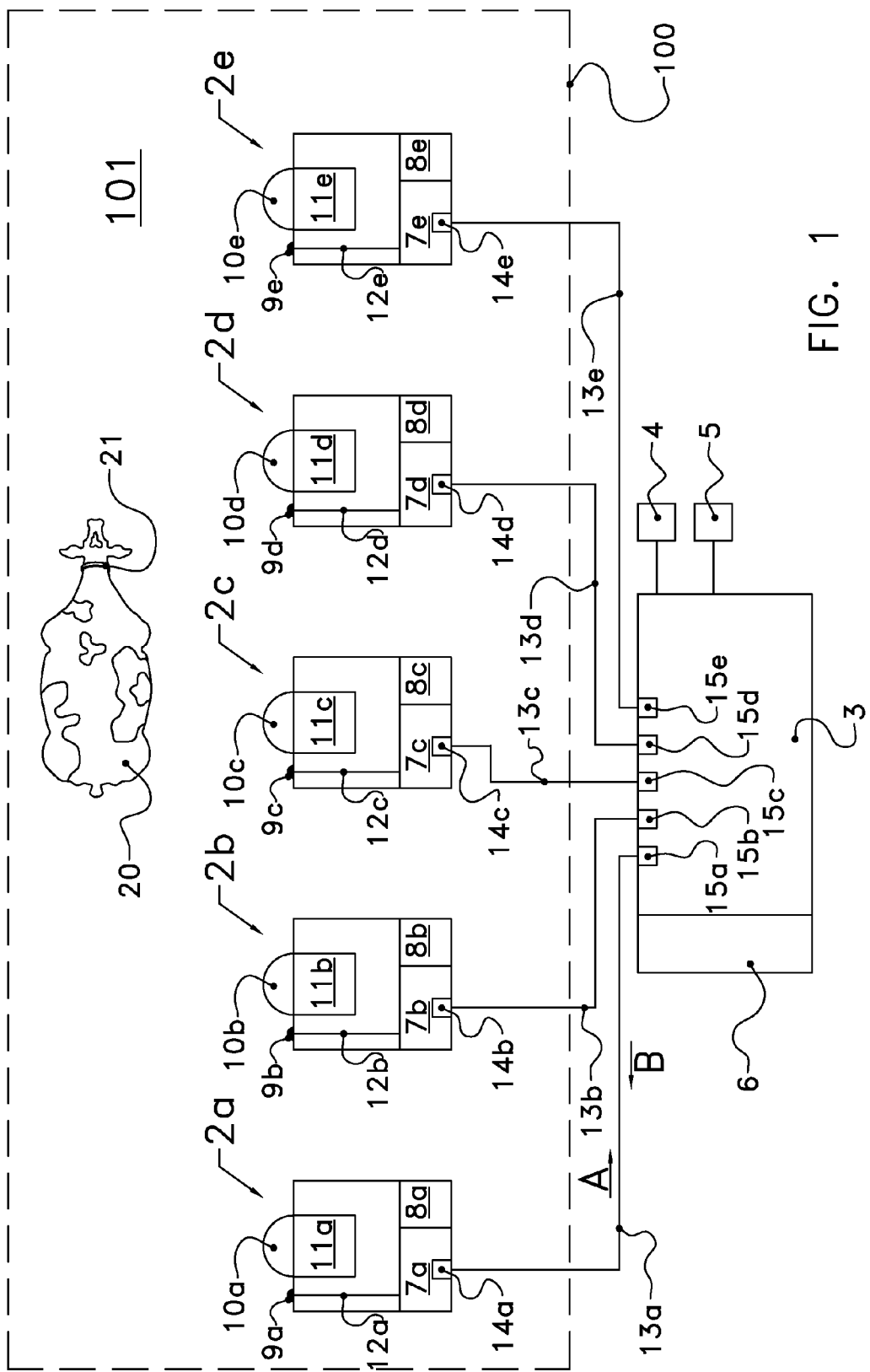
FIG. 1 shows a schematic embodiment of a feed supply system according to the invention.

FIG. 1 shows schematically an automated feed system 1, which, in this example, comprises five feed stations 2a-e, which are located within a defined area 101 surrounded by an enclosing cattle partition 100 and which are each accessible therein to the cows 20 (only one is shown) which are located in the area 101. Each cow carries a transponder 21, which is coded individually for each cow.

Each feed station 2a-e comprises a feed dose dispenser 11a-e provided with a feed supply and a feed container 10a-e. Each feed station 2a-e further comprises a sensor 9a-e, with which the transponder 21 can be detected and which transmits an associated signal via a connection 12a-e to a local programmable control unit 7a-e, usually a computer. The computers 7a-e are provided with a memory 8a-e which is readable and writable by said computers. This memory 8a-e contains, inter alia, separately for each cow, identification data, the feed dose per period (for example one hour) for that cow and the feed balance for that cow, along with the feed dose last supplied to that cow. The term "balance" refers to the sum of feed doses which the cow has not yet received, whereas these, according to the program, could have been received and could still be received. In each period, a (period) dose is thus added to the balance, with or without retention of the remaining balance (maximized or otherwise) at the end of the previous period, and a supplied dose is subtracted if, in one embodiment, a cow has received a dose or, in another embodiment, a cow has consumed a dose. In the latter case, the amount of the consumed dose is determined by weighing at the feed container (comparison of the mass of the dose placed in the feed container minus the remainder in the feed container following the departure of the animal).

The computers 7a-e are connected via a data connection 13a-e, which may be wired or wireless, to a central control unit 3, also usually a computer. For the transmission of data from the local computer 7a-e to the central computer 3 (direction A), the data connections 13a-e form first data transmitters and, in the opposite direction (direction B), second data transmitters. The central computer 3 is provided with a memory 6 which is readable and writable by said computer and which is connected to a program input 4 and data input 5.

The central memory 6 contains, inter alia, separately for each cow, identification data, the lactation data, the milk yield, a feed program to be followed at that time by that cow and the feed programs followed by that cow in preceding periods, and the feed history of that cow, on the basis of data received via the data connection 13a-e of the computer 7a-e relating to feed doses supplied to that cow by the feed stations 2a-e.

The central computer 3 is programmed to operate as a central cow feed management system, using the data in the memory 6. At the beginning of a new cycle, which lasts, for example, 12 hours or 24 hours, the central computer 6 calculates, with reference to the data relating to the condition of the cow, how much feed the cow concerned can receive within the following cycle, possibly with the addition of the quantity of feed remaining from the previous cycle, and the resulting dose per period, the program dose, and transfers that datum to each local computer 7a-e. The new program dose is then used therein.

The local computers 7a-e are each programmed to identify a cow 20 standing near a sensor 9a (for example) and to compare the feed balance with the feed dose according to the feed program for this cow (the program dose, a quantity of feed per time unit, in particular per hour) and, if the feed balance is greater than the feed dose according to the feed program, to control the feed dose dispenser 11a in such a way that the cow 20 obtains the feed dose which this cow must be given on the basis of the feed program to be followed by this cow.

Data relating to the feed dose then supplied are made available via the data connection 13a, immediately or at a later time, to the central computer 3 for storage in the memory 6, and also to the local control units 7b-e of the other feed stations 2b-e. Both in the visited feed station 2a and in the other feed stations 2b-e (following reception of these data), the balance stored in the memory 8a-e for the animal concerned is reduced by the relevant local computer 7a-e by the supplied feed dose.

If one or more of the data connections 13a-e are affected by a fault and therefore fails, which may occur either totally or partially and may occur in the relevant aforementioned first data transmitters and/or the relevant aforementioned second data transmitters, the feed stations 2a-e can operate autonomously. The fault may entail, for example a cable break, in the case of use of data cables in the data connections 13a-e, or a fault in a transmitter or receiver, or signal interference in the case of wireless data connections 13a-e.

Figure 2:
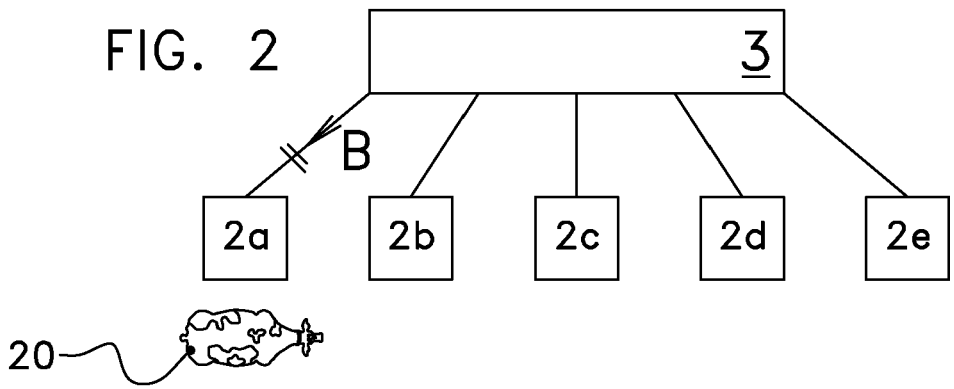
FIG. 2 shows a diagram of the set-up shown in FIG. 1, in a first condition of use.

If, for example, see FIG. 2, a cow 20 visits a feed station 2a to receive feed therefrom, and the data connection 13a fails in the direction B, the local computer 7a cannot receive any data relating to feed doses supplied by one or more of the other feed stations 2b-e and, contrary to the actual condition, the feed balance in the memory 8a will not be reduced.

Figure 3:
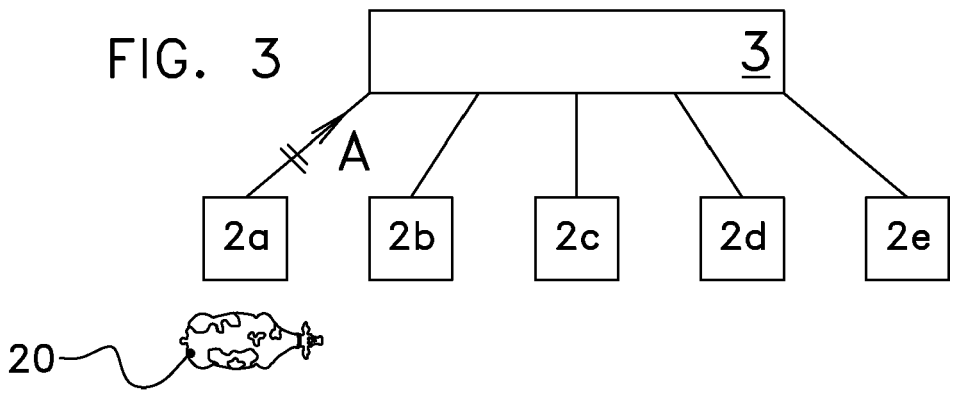
FIG. 3 shows a diagram of the set-up shown in FIG. 1, in a second condition of use.
Figure 4:
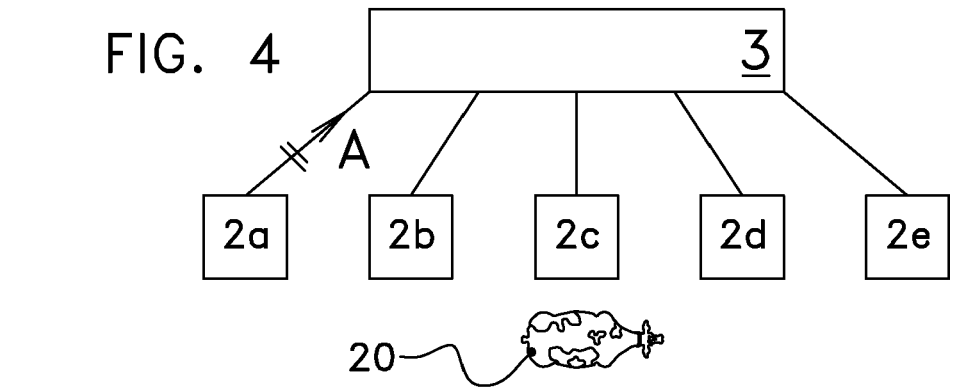
FIG. 4 shows a diagram of the set-up shown in FIG. 1, in a third condition of use.
Figure 5:
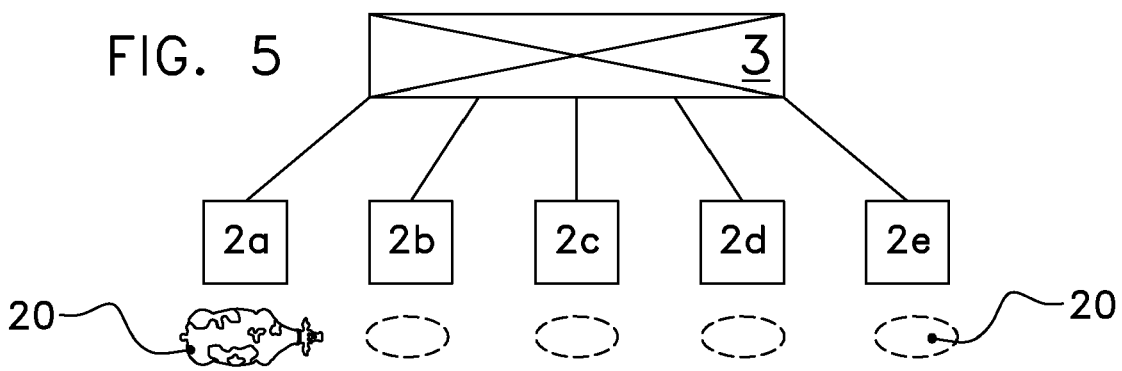
FIG. 5 shows a diagram of the set-up shown in FIG. 1, in a fourth condition of use.

Conversely, in the event of failure in the direction A, FIGS. 3 and 4, a feed dose supplied by the feed station 2a cannot be made available to the local computers 7b-e of the other feed stations 2b-e, so that the feed balance stored in the memories 8b-e is not reduced.

A cow can then be given much more feed than is permitted according to the feed program (feed received if the feed balance is zero), which is particularly disadvantageous if the feed is concentrated feed.

To reduce this disadvantage, in this example shown in FIG. 1, a timer 14a-e is provided in each local computer 7a-e at each of the inputs of the data connections 13a-e, i.e. for the second data transmission (B). The local computer 7a-e, in the present example 7a, can determine with the timer 14a that no signal has been received from or via the central computer 3 within a predefined period via the data connection 13a in the direction B, relating to a feed dose supplied by a different feed station 2b-d. The local computer 7a is configured to control the feed dose dispenser 11a in this case to supply a limited safety dose compared with the feed dose which could have been given according to the program. The supplied safety dose is then subtracted from the feed balance in the memory 8a.

If the data connection 13a remains active in the direction A, the supply of the (limited) feed dose in the feed station 2a can be transferred to the other feed stations 2b-e. It can be recorded therein by the local computers 7b-e with the aid of a comparator that a limited feed dose has been supplied, whereupon the local computers are also switched over as a safety precaution to a safety regime involving the supply of limited doses. The local computers 7a-e can be programmed in this case to initiate the supply of 1/n times the feed dose according to the feed program for a cow identified at the feed station concerned, where n is equal to the number of feed stations, in this case five.

In the event of failure of the data connection 13a in the direction A, FIG. 3, this can be recorded in one embodiment, for example with the aid of the timer 14a, due to the absence of a return signal in the direction B, whereupon the local computer 7a switches over to the supply of safety doses if a cow appears at that feed station for feed. The risk of overfeeding is thus already limited to some extent. To further limit this risk, in the event that a cow 20 appears for feed at a different feed station, such as feed station 2c in FIG. 4, the timer 15a of the central computer 3 can be used. With this timer 15a, it can be recorded that no signal has been received from a local computer 7a relating to a feed dose which has just been supplied by the feed station 2a. The central computer 3 is configured to transmit a signal to the local computers 7b-e which still have an operational data connection 13b-e to the central computer 3 so that these computers also switch over to the regime of supplying a limited feed dose, in particular to initiate the supply of the aforementioned limited dose of 1/n times the feed dose according to the feed program for a cow identified at the feed station concerned, where n is equal to the number of feed stations, in this case five. For example, a program dose of 1 kg/hr becomes the limited dose of 1/5 kg/hr.

With the reading by the local computer 7c of data relating to feed supplies at one or more of the other feed stations, it is also possible in one embodiment to wait until the time when a cow appears for feed at the feed station 2c. The failure to provide the data from an earlier feed supply at the feed station 2a can be recorded with the aid of a comparator in the local computer 7c. The risk of overfeeding is then largely restricted if a signal is transmitted from the local computer 7c to the local computers, whereupon the latter can switch over to the restricted safety regime.

The data connections 13a-e may also fail as a result of a fault in the central computer 3 (FIG. 6), in which case they may all fail. If the central computer 3 fails, the timers 14a-e (or alternatively, comparators) of all feed stations 2a-e will send a signal to this effect to each local computer 7a-e, with the result that only a limited dose will be supplied at each feed station 2a-e. The local computers 7a-e can be programmed in this case to initiate the supply of 1/n times the feed dose according to the feed program for a cow identified at the feed station concerned, where n is equal to the number of feed stations, in this case five.

The supply of the limited safety doses can continue until the fault is cleared. A safety dose may, for example, be defined by the local computer as the existing balance for an animal, divided by the number of feed stations in the system. If the normal feed program recognises a maximum balance, the balance can then be divided by the number of stations.

In an alternative embodiment, the system 1 may form part of a system in which a number of milking stations with milking robots are located within a partition. Each milking station then comprises a feed station for concentrated feed. In this case, the central cow management system is also configured to manage the milking robots. As well as milking stations, this system may also comprise one or more separate feed stations.

Instead of limiting the dose which is actually to be supplied in the feed station, a safety intervention may also be incorporated in the build-up of the feed balance. Some examples are shown in FIGS. 6-8.

Figure 6:
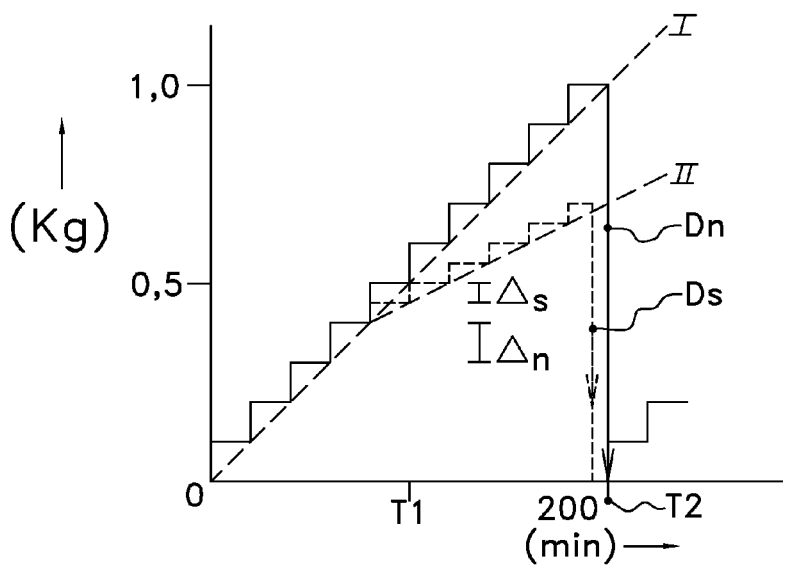
FIG. 6 shows a graph of a feed program for an animal, indicating a first possible change for safety for feed supply.

FIG. 6 shows a feed program loaded onto a local control unit, according to which, in this example, a 24-hour cycle, for example, is divided into 20-minute periods. The feed balance for one cycle for one animal is defined in the central computer and is then divided by the number of periods to define the required increase in the feed balance per period. This datum is forwarded to the local computers of the feed stations. In the example shown in FIG. 6, the feed balance is increased from 0 kg balance by 0.1 kg for each 20-minute period. At time T2, after 200 minutes, the feed balance is 1 kg. If the cow appears at the feed station at that time to receive feed, the cow can, in this example, receive the entire 1 kg balance (this is done in successively dispensed portions of, for example, 60 grams, for as long as the cow is present at the feed station and until the balance is used up. Thereafter, the build-up of the feed balance begins again from 0 kg. If the cow consumes less feed than the balance, the balance is further built up from the portion of the balance that remains within the same cycle.

If the aforementioned data connection failure is detected at time T1, the local computer will, in this example, reduce the increase in the feed balance for each period from $\Delta n$ (normal) to $\Delta s$ (safety). For illustrative purposes, the example is based on a group of two feed stations, wherein the increase is then divided by 2 (in the case of n feed stations, divided by n). As a result, the line I indicating the feed supply—time relationship will slope more gently from that time, see line II. The maximum dose which a cow can receive at T2 is then reduced from Dn (here 1 kg) to Ds (here 0.6 kg). If the cow receives this dose, the feed balance will again be built up according to relationship II. If the cow appears for feed at a later time, the feed balance will be further built up according to the safety regime (relationship II).

Figure 7:
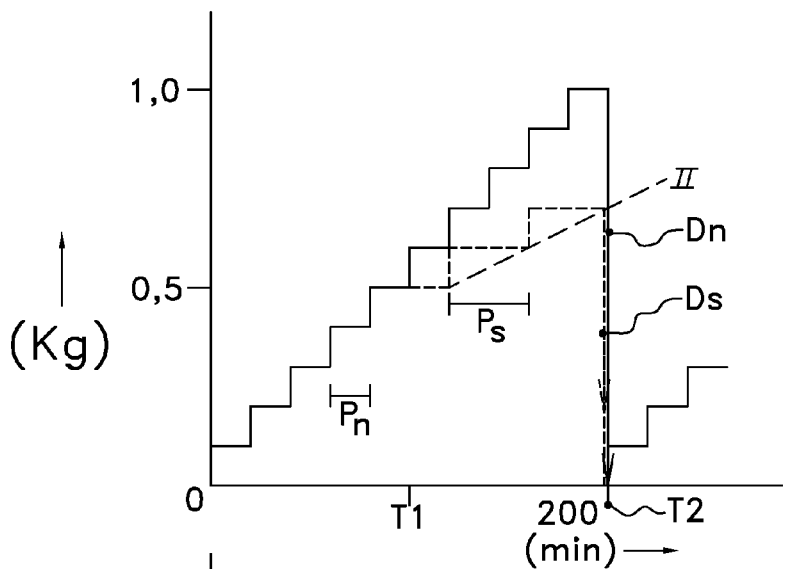
FIG. 7 shows a graph of a feed program for an animal, indicating a second possible change for safety for feed supply.
Figure 8:
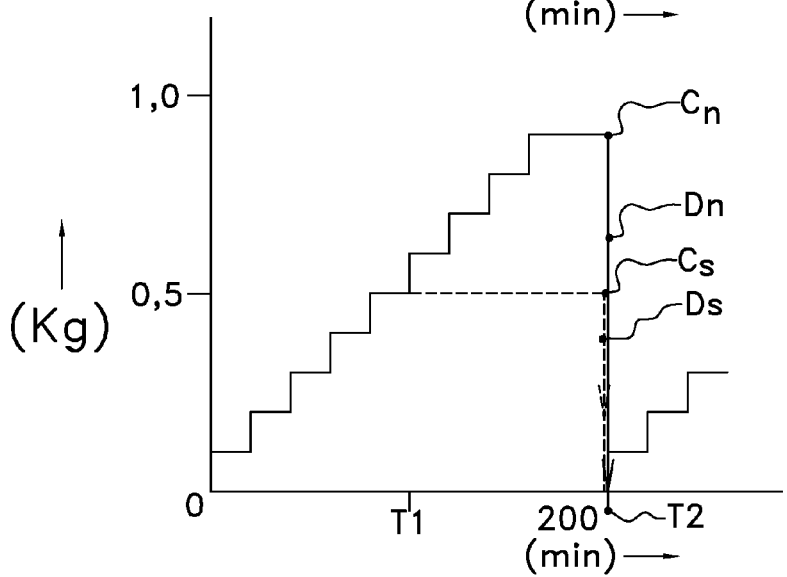
FIG. 8 shows a graph of a feed program for an animal, indicating a third possible change for safety for feed supply.

FIG. 7 shows an alternative way to slow down the build-up of the feed balance. Here, the period duration is doubled as from T1 (in the case of two feed stations, and, in the case of n feed stations, multiplied by n), from Pn—20 minutes—to Ps—40 minutes. The slope of the feed balance—time relationship then also becomes more gentle.

In FIG. 8, the feed program is set with a maximum feed balance build-up, in this example Cn=1 kg. In the event of a detected data connection failure at T1, the local computer will reduce the value of the maximum balance to Cs. This can be done by dividing by the number of feed stations, in this example 2. Following the supply of a feed dose, the new maximum continues to be maintained until the fault is again cleared.

Thus, the invention has been described by reference to certain embodiments discussed above. It will be recognized that these embodiments are susceptible to various modifications and alternative forms well known to those of skill in the art. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method of supplying feed to animals with the aid of a group of feed stations which are accessible to those animals, wherein the feed stations, following the identification of an animal, supply feed to that animal according to a feed program for that animal adjusted to that individual animal and taking into account data relating to earlier feed supplies to that animal, wherein data relating to a feed supply to an animal are made available to each feed station via data connections, wherein, in the event of failure of the data connection for at least one of the feed stations, at least one of the feed stations is operated to switch over to a safety feed program to reduce the feed supply to an animal identified at that feed station.

2. The method according to claim 1, wherein the feed program is applied, in the absence of the aforementioned failure, for one cycle, said cycle being divided up into a number of periods, wherein, for each period and for each animal, a period feed dose calculated for that animal is added to a feed balance for that animal, wherein feed supplies to that animal are subtracted from the feed balance.

3. The method according to claim 2, wherein the safety feed program comprises the slowing down of the increase of the feed balance in comparison with the increase thereof according to the feed program.

4. The method according to claim 3, wherein the slowing down of the increase of the feed balance is implemented by extending the period duration.

5. The method according to claim 4, wherein the slowing down of the increase is effected by multiplying the period duration according to the feed program by a number equal to the number of feed stations in the group.

6. The method according to claim 3, wherein the slowing down of the increase of the feed balance is implemented by reducing the period dose.

7. The method according to claim 6, wherein the slowing down of the increase is effected by dividing the period dose according to the feed program by a number equal to the number of feed stations in the group.

8. The method according to claim 2, wherein the safety feed program entails the maximization of the feed balance.

9. The method according to claim 8, wherein a maximum feed balance is maintained in the feed program, wherein the maximum feed balance according to the safety feed program is lower than the maximum feed balance according to the feed program.

10. The method according to claim 9, wherein the maximum feed balance according to the safety feed program is set to the maximum feed balance according to the feed program, divided by a number equal to the number of feed stations in the group.

11. The method according to claim 1, wherein the feed program supplies a program dose adjusted to the individual animal and the safety feed program entails the replacement of the program dose with a safety feed dose which is less than the program feed dose for the animal concerned.

12. The method according to claim 11, wherein the safety dose is equal to or less than the program feed dose for that animal, divided by the number of feed stations in the group.

13. The method according to claim 1, wherein, in the event of failure of the data connection for at least one of the feed stations, that feed station is operated to switch over to the safety feed program.

14. The method according to claim 13, wherein, in the event of failure of the data connection to at least one of the feed stations, that feed station is operated to switch over to the safety feed program.

15. The method according to claim 13, wherein, in the event of failure of the data connection from at least one of the feed stations, that feed station is operated to switch over to the safety feed program.

16. The method according to claim 1, wherein, in the event of failure of the data connection for at least one of the feed stations, one or more of the other feed stations are operated to switch over to the safety feed program.

17. The method according to claim 16, wherein, in the event of failure of the data connection from at least one of the feed stations, one or more of the other feed stations are operated to switch over to the safety feed program.

18. The method according to claim 1, wherein, in the event of failure of the data connection for at least one of the feed stations, each feed station is operated to switch over to the safety feed program.

19. The method according to claim 1, wherein the safety feed program is run by the dedicated local control unit of the relevant visited feed station which is connected in normal use to the data connection, after the local control unit has detected the failure of the data connection.

20. The method according to claim 1, wherein the data connection is connected to a central data storage and processing facility.

21. The method according to claim 20, wherein the central data storage and processing facility forms part of a central control unit,
wherein, if the failure of the data connection results from a fault in the central control unit, all feed stations are operated to switch over to the safety feed program.

22. The method according to claim 20, wherein the central data storage and processing facility forms part of a central control unit,
wherein the central control unit remains operational and detects the failure of the data connection from a local control unit and controls the other local control units on the basis thereof to switch over to the safety feed program.

23. The method according to claim 1, wherein the failure of the data connection is detected if no data relating to earlier feed supplies are made available via this data connection within a defined period.

24. The method according to claim 1, wherein the failure of the data connection is detected if, in the event that one feed station in which an animal has been identified requests data relating to feed supplies which have been made to that animal by one or more other feed stations, these data are not made available.

25. The method according to claim 1, wherein the supply of feed is combined with the milking of the animal in a milking station provided at a feed station visited by the animal.

26. The method according to claim 1, wherein a feed supply is equated with a quantity of feed made available to an animal during one visit to a feed station by that animal.

27. The method according to claim 1, wherein a feed supply is equated with a quantity of feed consumed by an animal during one visit to a feed station by that animal.

28. A system for supplying feed to animals, comprising
a group of feed stations available to these animals,
wherein each feed station is provided with
a feed supply device,
an identifier for identifying an individual animal,
an accessible local memory for storing a feed program adjusted to the individual animal, and
a local control unit to determine, on the basis of the identification and the associated stored feed program, a feed dose to be supplied and to operate the feed supply device on the basis thereof, furthermore comprising first data transmitters for the provision of animal-related data relating to a feed supply by the feed supply device of a feed station used by an animal from the local control unit concerned to the local control units of the other feed stations, and second data transmitters for the reception, by the local control unit of a feed station to be used by an identified animal, of the animal-related data relating to an earlier feed supply by the feed supply device of a feed station used by that animal, wherein the system is provided with at least one detector to detect a fault in the transmission of data by at least one of the first and/or second data transmitters, and the system is configured to operate, on the basis of the fault detected by the detector, at least one of the feed stations to switch over to a safety feed program to reduce the feed supply to an animal identified at that feed station.

29. The system according to claim 28, wherein the detector is configured to detect a fault in the transmission of data by a second transmitter.

30. The system according to claim 29, wherein each local control unit is provided with an aforementioned detector, and is configured to switch over to the safety feed program on the basis of a fault detected by this detector.

31. The system according to claim 28, provided with a central control unit, which supplies the first and second data connections.

32. The system according to claim 31, wherein the central control unit is provided with a detector to detect a fault in the transmission of data by the first data transmitters from one of the local control units, and is configured to send a signal to the other local control units on the basis thereof to switch over to the safety feed program.

33. The system according to claim 28, wherein the detector comprises a timer.

34. The system according to claim 28, wherein the detector comprises a comparator.

35. The system according to claim 28, wherein the safety feed program is settable depending on the number of feed stations in the group.

36. The system according to claim 28, wherein at least a number of feed stations are provided in a respective dedicated milking station.

37. The system according to claim 28, wherein the group of feeding stations is surrounded by an animal partition.

38. A system configured to carry out a method of supplying feed to animals with the aid of a group of feed stations which are accessible to those animals, wherein the feed stations, following the identification of an animal, supply feed to that animal according to a feed program for that animal adjusted to that individual animal and taking into account data relating to earlier feed supplies to that animal, wherein data relating to a feed supply to an animal are made available to each feed station via data connections, wherein, in the event of failure of the data connection for at least one of the feed stations, at least one of the feed stations is operated to switch over to a safety feed program to reduce the feed supply to an animal identified at that feed station.

\* \* \* \* \*